Figure 1:
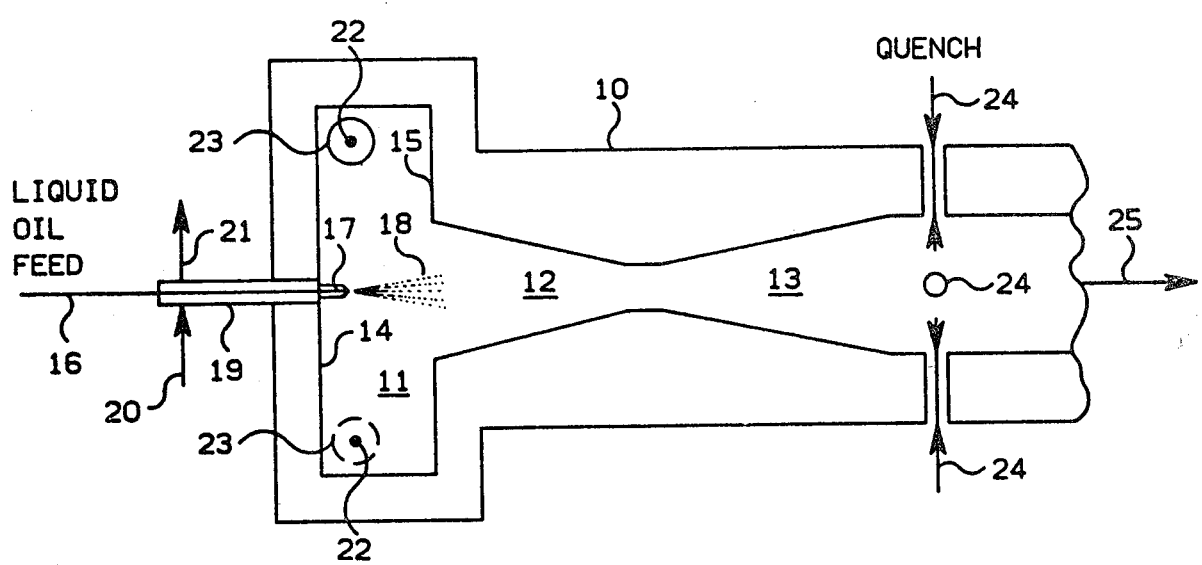

United States Patent [19]

Cheng

[11] 4,446,108
[45] May 1, 1984

[54] CARBON BLACK MANUFACTURE

[75] Inventor: Paul J. Cheng, Bartlesville, Okla.

[73] Assignee: Phillips Petroleum Company, Bartlesville, Okla.

[21] Appl. No.: 351,703

[22] Filed: Feb. 24, 1982

Related U.S. Application Data

[62] Division of Ser. No. 197,455, Oct. 16, 1980, Pat. No. 4,339,422.

[51] Int. Cl.³ .................. B01J 10/00; B01J 19/26; C01B 31/02; C09C 1/48
[52] U.S. Cl. .................. 422/156; 239/488; 422/151; 423/456
[58] Field of Search ............... 422/150-157; 423/456; 239/488, 513, 514, 515

[56] References Cited

U.S. PATENT DOCUMENTS

| | | | |
|---|---|---|---|
| 2,781,247 | 2/1957 | Krejci | 422/156 |
| 3,079,236 | 2/1963 | Heller et al. | 422/151 |
| 3,642,446 | 2/1972 | Heller et al. | 422/150 |
| 4,133,485 | 1/1979 | Bouvin | 239/488 |
| 4,164,540 | 8/1979 | Slagel et al. | 422/151 |
| 4,321,248 | 3/1982 | Cheng | 423/456 |

Primary Examiner—Michael S. Marcus

[57] ABSTRACT

High tint residual carbon black is produced in a vortex flow, venturi oil furnace carbon black reactor by charging the liquid feed or make hydrocarbon axially as a solid jet into a swirling mass of hot combustion gases upstream from the venturi and passing the hydrocarbon feed and hot combustion gases under carbon black forming conditions through the venturi section of the carbon black reactor.

4 Claims, 2 Drawing Figures

CARBON BLACK MANUFACTURE

This application is a divisional of my copending application having Ser. No. 197,455, filed Oct. 16, 1980, now U.S. Pat. No. 4,339,422.

This invention relates to carbon black. In another aspect, this invention relates to a carbon black reaction system in which high tint residual carbon blacks can be produced. In a further aspect, this invention relates to a method of introducing hydrocarbon feedstock into an oil furnace process for the production of high tint residual carbon black. In a further aspect, this invention relates to a furnace-type carbon black producing process whereby the hydrocarbon to be decomposed in separately and forcefully injected into a swirling mass of hot gases within the furnace chamber and is rapidly mixed therewith whereby the hydrocarbon is decomposed by heat absorbed from the hot gases to form high tint residual carbon black in gaseous suspension.

A broad variety of carbon blacks has been disclosed in the art. These blacks differ in many properties from each other and are made by different procedures. The main field of use of the blacks depends upon their properties. Since the carbon black, as such, cannot be sufficiently characterized by its chemical composition or by its ingredients, it has become widely accepted to characterize the carbon black by the properties it exhibits. Thus, the carbon black can, for example, be characterized by its surface area which is usually an inverse measurement of the nodule size. Another important characteristic of the carbon black is its structure which is a measure of the complexity of the individual carbon aggregates or the number of nodules "fused" together in one carbon black aggregate.

Lately, however, an additional quality standard for some tread grade reinforcing carbon blacks has been assuming importance. Such concerns the particle size distribution of the resultant product. Essentially, the property change being sought in this regard is to produce a product composed of more uniform particle sizes and, particularly, the elimination of the large and small particle size component associated with the heretofore standard products. In this connection, particle size refers to the size of the resultant agglomerates. These new products are referred to as high tint residual blacks named so because of the empirical method utilized to determine this property.

In carbon black processes of the general type to which the present invention relates, the hydrocarbon make is usually injected into the furnace chamber as an expanding stream or cone. I have found, most surprisingly, that by simple modification of such furnace process and particularly the manner in which the hydrocarbon make stream is injected, I can as noted above produce carbon blacks having high tint residual values.

Accordingly, an object of this invention is to provide an improved process of making carbon black in a furnace by partial combustion and/or pyrolytic conversion of hydrocarbons.

Another object of this invention is to provide an improved process of producing high tint residual carbon blacks.

A further object of this invention is to provide a feedstock injector which facilitates the production of high tint residual carbon black in the oil furnace process.

Other objects, aspects, and the several advantages of this invention will become apparent to one skilled in the art upon a study of this specification, the appended claims, and the drawing.

In accordance with the invention, it has been found that by charging a hydrocarbon feedstock or make oil as a "solid" stream or jet instead of using the conventionally used pressure atomizing nozzles, one can produce high tint residual carbon blacks which will have sufficiently high tinting strengths to meet some customers' specifications and also will have the other carbon black properties meeting these customers' specifications.

In one embodiment of the invention, high tint residual carbon black is produced in a vortex flow venturi oil furnace carbon black reaction system by chargin the liquid feed or make hydrocarbon axially as a solid jet or stream into the swirling hot combustion gases upstream from the venturi section of the carbon black furnace.

According to the invention, carbon black is produced by an improved process using a reaction system having a cylindrical section, which is relatively short and of large diameter, referred to hereinafter as the "combustion" or "vortex section" and an elongated coaxial venturi section having an inlet diameter equal to or smaller than that of the combustion section and referred to hereinafter as the "venturi reaction section".

Broadly, the operation comprises introducing a hydrocarbon stream or "reactant hydrocarbon" axially as a solid stream into the combustion section or vortex section, and thence into the venturi reaction section of the furnace. An inflammable mixture of air and fuel gas is introduced into the combustion or vortex section in a direction tangent to its cylindrical sidewall and the mixture is burned to combustion gases before it comes in contact with the carbon black producing reactant hydrocarbon at the axis of the chamber. Preferably, combustion to hot combustion gases occurs prior to the gases entering the vortex section. The combustion gases and the reactant hydrocarbon then pass through the venturi reaction section in a state of sufficient velocity to flow spirally inward in the combustion section and helically through the venturi reaction section. The reactant hydrocarbon is converted or decomposed to carbon black by heat transferred to by and mixing with the combustion gases and by radiation. The gaseous effluent carrying the carbon black from the reactor is cooled, then the carbon black is separated therefrom by any usual means known in the art, such as passing the effluent to bags to filter out the carbon black or as by passing the effluent through an electrical precipitator and/or cyclone separator, or a combination of these separations.

As discussed above, the carbon black reactor, according to the instant process, is basically a tubular carbon black reactor with a wide precombustion or vortex section followed by a narrow venturi reaction section. The diameter of the precombustion section is about 8 to 39 inches whereas the axial length of this precombustion or vortex section is about 3 to about 25 inches. The venturi reaction section, which is a narrow section, has an upstream inlet diameter of about 3 to 39 inches and a downstream outlet diameter of about 3 to 25 inches. Means are provided for generating a hot combustion gas vortex in the precombustion section as well as means for introducing hydrocarbon feedstock. The hydrocarbon feedstock can be introduced either at the longitudinal axis and at the upstream confining wall of the precombustion section or can be introduced at a point downstream from the confining wall up to the entrance of the venturi reaction section.

The venturi reaction section is about 10 to about 100 inches long. The entrance portion of the reaction section converges in a downstream direction at an angle between the reactor axis and the frustoconical surface in the range of about 10° to 20° and the downstream diameter at the throat of the reaction section is about 1.5 to 15 inches.

The invention will be more fully understood from a description of the drawings, which illustrate a vortex flow venturi oil furnace carbon black reactor embodying the invention of injecting a solid stream or jet of hydrocarbon feed.

Referring now to FIG. 1, a carbon black reactor is shown in cross-section, wherein the tubular reactor is confined by a shell 10 of heat resistant material, such as ceramics. The internal shape of the reactor is essentially rotationally symmetrical around the reactor longitudinal axis. The reactor is composed of a precombustion or a vortex section 11 and a first reaction section 12 and a second reaction section 13. All of these sections are in open communication, longitudinally axially aligned, and operatively connected with each other. The first reaction section 12 is essentially a frustoconical section converging in the downstream direction and the second reaction section is a frustoconical section diverging in the downstream direction. The precombustion or vortex section 11 is a cylindrical section confined by an upstream wall 14 and a downstream confining wall 15.

Figure 2:
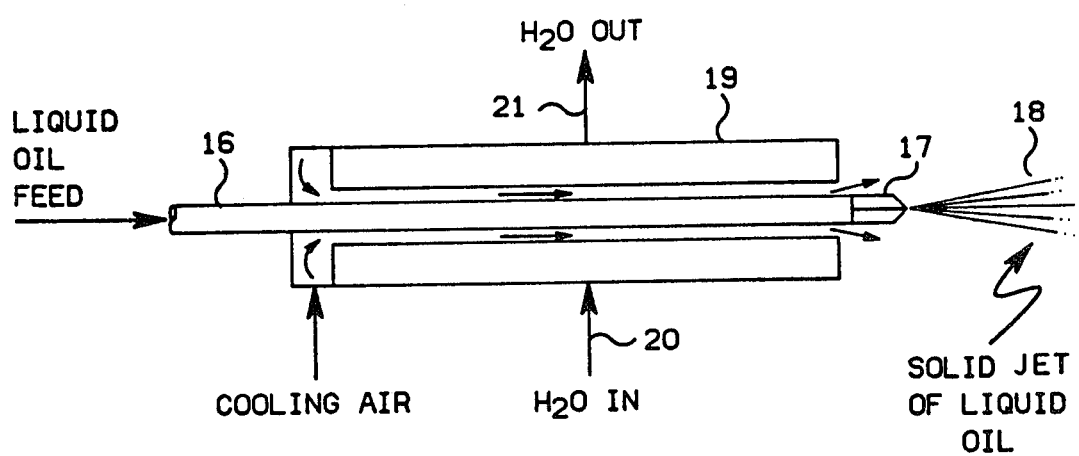

Normally liquid hydrocarbon feedstock is introduced into the reactor by line 16 which is equipped with a discharge nozzle 17 which projects a short distance into precombustion section 11. As will be seen from the specific example hereinbelow, the tip or end of discharge nozzle 17 is positioned 1 inch and 1¼ inches from the face of the upstream confining wall 14. However, it is within the scope of the invention to arrange the discharge nozzle to be flush with the upstream wall 14 as well as extend up to about the entrance portion of the second reaction section 13. Suitable discharge nozzles are available in the prior art that will inject a solid stream 18 of hydrocarbon feedstock into the vortex section 11 and into the entrance of reaction section 13. The hydrocarbon feed line 16 is surrounded by a pipe 19 for the introduction of water or other coolant by way of line 20 and exit by way of line 21. (See FIG. 2). The reactant coolant is introduced in order to protect the oil feed pipe 16 and nozzle 17 from the detrimental effects of high temperature gases in the combustion or precombustion or vortex section 11.

A vortex of hot combustion gases can be generated within precombustion section 11; however, the hot gases preferably are produced in the tangential tunnels which are in open communication with the precombustion section 11. Fuel is introduced into the tunnel tangential to the precombustion section 11, and for this purpose from discharge nozzle 22. This fuel, which can be natural gas, propane, fuel oil, or conversion oil is combusted with air or other oxygen-containing gas which is introduced by way of the tunnel 23 surrounding gas discharge nozzle 22.

The hydrocarbon feedstock is axially introduced as a solid jet stream at about 0 degree exit spray angle from nozzle 17 and contacted with the vortex of hot combustion gases, and the reaction mixture is passed through the first reaction section 12 under the carbon black forming conditions and after passing through the venturi throat is expanded into second reaction section. The effluent reaction mixture containing carbon black is contacted with a quenching fluid, e.g., water or cooled recycled smoke, injected downstream from reaction section 13 by way of line 24. The quenched carbon black containing smoke can be withdrawn from the reactor by way of smoke withdrawal line 25, and passed to conventional carbon black recovery, not shown.

A typical commercial reactor in accordance with the drawing will have the dimensions shown in the following tabulation; in inches except where noted:

Diameter of precombustion section 11=24
Diameter of upstream end of first reaction section 12=12
Diameter of downstream end of second reaction section 13=15
Axial length of the precombustion section 11=12
Axial length of the first reaction section 12=9
Axial length of the second reaction section 13=28
Diameter of the cylindrical venturi throat=7; length 3.5
Total angle of venturi degrees: converging=31; diverging=16
Position of oil nozzle outlet 17, from upstream wall of 11=8
Diameter of tangential inlet 23=12
Quench 24 distance from wall 15=50

The invention will be yet more fully understood from the following example.

EXAMPLE

Four runs, to produce a high tint residual carbon black in accordance with this invention, were carried out in a reactor as described in connection with the drawings and, as specified with respect to the dimension shown in Table I. In two of the runs a solid jet hydrocarbon feedstock was injected into the precombustion section and in two of the runs (control runs), the feed was introduced as an atomized jet of hydrocarbon feed at 90° spray angle, semi solid spray. The feed oil used in all the runs had an API Gravity 60°/60° F. of 0.6; a boiling range, °F., of about 600 to 1000; a 50% boiling point of 810° F., and a BMCI of 124.

In two runs, a control and an invention run were carried out in a reactor having a precombustion section with a length of four inches (BJ reactor) and the other two runs, one being a control, were carried out in a reactor having a precombustion chamber length of 11 inches (BK reactor). In addition, the tip of the oil feed nozzle in the BJ reaction runs was one inch from the face of the precombustion chamber upstream wall and 1.25 inches in the BK reaction run.

Propane was the fuel in all of the runs, used 50 volume percent more air than that required for stoichiometric combustion of propane to $CO_2$ and $H_2O$.

The reactants introduced into the reactor as well as the properties of the carbon black produced are shown in the following table.

TABLE

| Air SCF/hr | Oil Lbs/hr | CTAB m²/gm | C-DBP cc/100 gm | N₂SA M²/gm | Tinting Strength | Tint Residual | Oil Feed |
|---|---|---|---|---|---|---|---|
| 7,500 | 41 | 98 | 96 | 120 | 100 | −3.9 | Pressure Atomized[a] |
| 7,500 | 40.9 | 115 | 98 | 134 | 116 | +4 | Solid Jet[b] |
| 7,500 | 75.8 | 89 | 100 | 99 | 102 | +1.6 | Pressure Atomized[c] |
| 7,500 | 64.4 | 127 | 102 | 147 | 128 | +12.5 | Solid Jet[d] |

[a] BK Control, using nozzle 6 PLP-90° (90° semi-solid cone)
[b] BK Invention, using nozzle TT00067 (solid jet, 0°)
[c] BJ Control, using nozzle 9.5 PLP-90° (90° semi-solid cone)
[d] BJ Invention, using nozzle TT0001 (solid jet, 0°)

The above data in the BK operation illustrate, at the same fuel, air, and oil rates, that the BK control run, using the pressure atomizing nozzle (6 PLP-90°) produced much lower tinting strength (100) carbon black than the tinting strength (116) produced in the BK invention run using the solid jet (TT 00067). The tint residual which is a useful way of measuring relative tinting strengths, increased from −B 3.9 in the control run to +4 in the invention run.

The above data in the BJ invention operation illustrates that the tint residual in the invention run using the solid jet oil injection (TT 0001) was +12.5 as compared with the control run with a lower tint residual of +1.6 using automization nozzle (9.5 PLP-90°). Tint residual is calculated from other carbon black properties as follows, using ASTM tests for these properties:

Tint Residual = Tinting Strength − [56.0
  + 1.057(CTAB) − 0.002745(CTAB)² − 0.2596(C-DBP) − 0.201(N₂SA-CTAB)]

CTAB, m²/gm; ASTM D 3765-79;
C-DBP, cc/100 gm; ASTM D 3493-76;
N₂SA, m²/gm; ASTM D 3037-76 (Method A);
Tinting Strength; ASTM D 3265-76.

PLP Nozzles are available from Monarch Manufacturing Works, Inc., 2501 East Ontario Street, Philadelphia, Pa.

TT Nozzles are available from Spraying Systems Company, 3201 Randolph Street, Bellwood, Ill.

BMCI is the conventional Bureau of Mines Correlation Index. U.S. Pat. No. 3,009,784, issued Nov. 21, 1961, Phillips Petroleum Company, in FIG. 7, shows a typical indirectly water-cooled oil injection assembly which can be used with the PLP and TT nozzles used in this invention. This reference is hereby incorporated by reference.

TABLE I

Reactors Used for Data
(Dimension in Inches, Except Where Noted)

| | REACTORS | |
|---|---|---|
| | BK | BJ |
| Diameter of Precombustion Section 11, | 10.75 | 10.75 |
| Diameter of Upstream End of First Reaction Section 12, | 4 | 4 |
| Diameter of Downstream End of Second Reaction Section 13, | 6 | 6 |
| Axial Length of Precombustion Section 11, | 11 | 4 |
| Axial Length of First Reaction Section 12, | 3.93 | 3.93 |
| Axial Length of Second Reaction Section 13, | 7.2 | 7.2 |
| Diameter of Venturi Throat, | 1.6 | 1.6 |
| Length of Venturi Throat, | 0.75 | 0.75 |
| Venturi Total Converging Angle, degrees, | 34 | 34 |
| Position of Oil Nozzle Outlet from Upstream Wall 14, | 1.25 | 1.0 |
| Diameter of Tangential Inlet Tunnel 23, | 3 | 3 |
| Quench 24 Downstream from Wall 15 | 12 | 25 |

I claim:

1. A carbon black furnace comprising a refractory lined heat insulated body having a generally cylindrical bore, said bore comprising in series
   a generally cylindrical first chamber having a diameter at least about equal to its length forming a precombustion or combustion chamber,
   means to introduce free oxygen-containing gas and fuel gas into said first chamber generally tangentially to the inner surface thereof to produce a vortex of combustion gases traveling axially in said cylindrical bore,
   a second chamber comprising a venturi section, the length of which is greater than its throat diameter and the throat diameter of which is substantially less than that of said first chamber, said second chamber being axially aligned and communicating with said first chamber, and
   injection means to introduce and direct a hydrocarbon feed generally axially along the longitudinal axis of said first chamber, said means being so constructed as to inject a solid jet liquid stream at essentially zero degree exit spray angle along the axis of said first chamber, the outlet end of said means for introducing hydrocarbon feed being positioned between the face of the upstream wall of said first chamber and the entrance to the venturi diverging section, and wherein said combustion gases and said hydrocarbon feed pass through the venturi section in a state of sufficient velocity to flow spirally inward in the combustion chamber and helically through the venturi section.

2. A furnace according to claim 1 wherein the point of hydrocarbon feed introduction into the first chamber is within about 1 to 28 inches of the face of the upstream wall of said first chamber.

3. A furnace according to claim 2 wherein the tip or end of the discharge nozzle is positioned between 1 inch and 1¼ inches from the face of the upstream confining wall of said first chamber.

4. A furnace according to claim 3 wherein the hydrocarbon feed nozzle is surrounded by coolant.

* * * * *